United States Patent [19]

Deller et al.

[11] Patent Number: 5,086,031
[45] Date of Patent: Feb. 4, 1992

[54] PRESSED PARTS BASED ON PYROGENICALLY PRODUCED SILICON DIOXIDE, METHOD OF THEIR PRODUCTION AND THEIR USE

[75] Inventors: Klaus Deller, Hainburg; Martin Förster, Büdingen; Helmfried Krause, Rodenbach, all of Fed. Rep. of Germany

[73] Assignee: Degussa Aktiengesellschaft, Fed. Rep. of Germany

[21] Appl. No.: 507,040

[22] Filed: Apr. 10, 1990

[30] Foreign Application Priority Data

Apr. 17, 1989 [DE] Fed. Rep. of Germany ....... 3912504

[51] Int. Cl.$^5$ .......................... B01J 21/14; B01J 21/00
[52] U.S. Cl. ..................... 502/251; 502/232; 502/263
[58] Field of Search ............... 502/232, 251, 263, 413, 502/240, 8; 423/335

[56] References Cited

U.S. PATENT DOCUMENTS

| 4,503,092 | 3/1985 | Klebe et al. | 423/335 |
| 4,877,595 | 10/1989 | Klingle et al. | 423/335 |
| 4,956,059 | 9/1990 | Englisch et al. | 423/335 |

*Primary Examiner*—Carl F. Dees
*Attorney, Agent, or Firm*—Cushman, Darby & Cushman

[57] ABSTRACT

Pressed parts based on pyrogenically produced silicon dioxide with the following physicochemical characteristic data:

| | |
|---|---|
| Outer diameter | 2 to 15 mm |
| BET surface | 50 to 400 m$^2$/g |
| Pore volume | 0.6 to 1.3 ml/g |
| Breaking strength | 50–150 N |
| Pore distribution | no pores <5 mn diameter only meso and macropores |
| Composition | >99% by weight SiO$_2$ |
| Abrasion | <1.0% |
| Bulk weight: | 400–500 g/l | are produced by homogenizing pyrogenically produced silicon dioxide with urea, methyl cellulose and/or magnesium stearate, graphite and aluminum stearate with the addition of water, dried at a temperature of 80° to 120° C., comminuted to a powder, pressing the powder to pressed parts and tempering the pressed parts for a period of 0.5 to 8 hours at a temperature of 400° to 1200° C.

3 Claims, No Drawings

PRESSED PARTS BASED ON PYROGENICALLY PRODUCED SILICON DIOXIDE, METHOD OF THEIR PRODUCTION AND THEIR USE

The present invention relates to pressed parts based on pyrogenically produced silicon dioxide, methods of producing them and their use as catalytic carriers or catalysts.

BACKGROUND OF THE INVENTION

Pyrogenically produced silicon oxides are distinguished by an extreme fineness and a correspondingly high specific surface, very high purity, spherical particle form and the absence of pores. Because of these properties, pyrogenically produced silicon oxides are becoming increasingly more interesting as carriers for catalysts (D. Koth, H. Ferch, Chem. Ing. Tech. 52, p. 628 (1980).

Since the particles of pyrogenically produced silicon oxides are especially fine, their deformation to catalytic carriers or catalysts presents several problems.

Published German Patent Application DE-OS 31 32 674 teaches a method for producing pressed parts of pyrogenically produced silicon oxides in which silica sol is used as a binding agent.

Published German Patent Application DE-OS 34 06 185 teaches a method for producing pressed parts in which glazed frit powder is used as a binding agent and glycerol is used as a lubricant.

German Patent DE-PS 21 00 77 teaches the addition of granulates based on pyrogenically produced silicon dioxide in order to produce e.g. vinyl acetate monomer as a catalytic carrier.

These known methods have the disadvantage that the pressed parts obtained do not exhibit the desired optimum properties such as e.g. a high breaking strength for certain catalytic reactions such as e.g. the production of vinyl acetate from ethylene, acetic acid and oxygen or the hydration of ethylene to ethanol.

SUMMARY OF THE INVENTION

The present invention relates to pressed parts based on pyrogenically produced silicon dioxide with the following physico-chemical characteristic data:

| | |
|---|---|
| Outer diameter | 2 to 15 mm |
| BET surface | 50 to 400 m$^2$/g |
| Pore volume | 0.6 to 1.3 ml/g |
| Breaking strength | 50-150 N |
| Pore distribution | no pores <5 nm diameter only meso and macropores |
| Composition | >99% by weight SiO$_2$ |
| Abrasion | <1.0% |
| Bulk weight: | 400-500 g/l |

The invention also provides a method for producing pressed parts based on pyrogenically produced silicon dioxide with the following physico-chemical characteristic data:

| | |
|---|---|
| Outer diameter | 2 to 15 mm |
| BET surface | 50 to 400 m$^2$/g |
| Pore volume | 0.6 to 1.3 ml/g |
| Breaking strength | 50-150 N |
| Pore distribution | no pores <5 nm diameter only meso and macropores |
| Composition | >99% by weight SiO$_2$ |
| Abrasion | <1.0% |
| Bulk weight: | 400-500 g/l |

In accordance with the method of the invention, pyrogenically produced silicon dioxide is homogenized with urea, methyl cellulose, aluminum stearate and/or magnesium stearate, and graphite under the addition of water, dried at a temperature of 80° to 120° C., comminuted to a powder, the powder is pressed to pressed parts and the pressed parts are tempered for a period of 0.5 to 8 hours at a temperature of 400° to 1200° C.

In principle, all mixers or mills are suitable for carrying out the method of the invention which make a good homogenization possible, such as e.g. blade, fluid-bed, gyratory or air-swept mixers. Mixers with which an additional compression of the mixing material is possible are especially suitable, e.g. plowshare mixers, mulling machines or ball mills. An extensive drying at 80°–120° C. can take place after the homogenization, so that a flowable powder is obtained after the comminution. The pressed parts can be produced on hand presses, eccentric presses, extruders or concentric-running presses as well as on compactors.

Prior to pressing, the mixture can exhibit the following composition in a preferred embodiment:

| | | |
|---|---|---|
| 1. | 50-90% by weight preferably 60-80% by weight | silicon dioxide |
| 2. | 0.1-20% by weight preferably 10 by weight and/or | aluminum stearate |
| | 0.1-20 by weight preferably 1-10 by weight | magnesium stearate |
| 3. | 0.1-20 by weight preferably 1-5% by weight | graphite |
| 4. | 5-48 by weight preferably 10-40 by weight | pore former such as urea or methyl cellulose |

The pressed parts can have different shapes e.g. cylindrical, spherical or annular, with an outer diameter of 2 to 5 mm.

The pressed parts are tempered at 400°–1200° C. for 30 minutes to 8 hours.

The breaking strength, specific total surface and the pore volume can be varied to some extent by varying the amounts of additives and the pressing force.

The pressed parts of the invention can be used either directly as catalysts or as catalytic carriers after they have been impregnated during or after their production with a solution of a catalytically active substance and optionally activated by means of a suitable post-treatment.

In particular, the pressed parts of pyrogenically produced silicon dioxide can be used especially well as carriers for the catalyst in the production of vinyl acetate monomer from ethylene, acetic acid and oxygen as well as catalyst in the ethylene hydration method.

The pressed parts of the invention have the following advantages:

High purity
Low abrasion
High pore volume
No pores >5 nm, only meso and macropores

DETAILED DESCRIPTION OF PREFERRED EMBODIMENTS

Examples

Silicon dioxides with the following physico-chemical characteristic data are used as pyrogenically produced silicon dioxide:

| Aerosil | | 90 | 130 | 150 | 200 | 300 | 380 |
|---|---|---|---|---|---|---|---|
| BET Surface Area | m$^2$/g | 90 ± 15 | 130 ± 25 | 150 ± 15 | 200 ± 25 | 300 ± 30 | 380 ± 30 |
| Average Size of Primary Particles | nm | 20 | 16 | 14 | 12 | 7 | 7 |
| | g/l | ca. 80 | ca. 50 | ca. 50 | ca. 50 | ca. 50 | ca. 50 |
| Drying Loss[2] (2 hours at 105° C.) | % | <1 | <1.5 | <0.5[7] | <1.5 | <1.5 | <1.5 |
| Annealing[2][5] loss (2 hours at 1000° C.) | % | <1 | <1 | <1 | <1 | <2 | <2 5 |
| pH[3] (in 4% aqueous Dispersion) | | 3.6–4.5 | 3.6–4.3 | 3.6–4.3 | 3.6–4.3 | 3.6–4.3 | 3.6–4.3 |
| SiO$_2$[6] | % | >99.8 | >99.8 | >99.8 | >99.8 | >99.8 | >99.8 |
| Al$_2$O$_3$[6] | % | <0.05 | <0.05 | <0.05 | <0.05 | <0.05 | <0.05 |
| Fe$_2$O$_3$[6] | % | <0.003 | <0.003 | <0.003 | <0.003 | <0.003 | <0.003 |
| TiO$_2$[6] | % | <0.03 | <0.03 | <0.03 | <0.03 | <0.03 | <0.03 |
| HCl[6][8] | % | <0.025 | <0.025 | <0.025 | <0.025 | <0.025 | <0.025 |
| Sieve residue[4] (according to Mocker, 45 um) | % | <0.05 | <0.05 | <0.05 | <0.05 | <0.05 | <0.05 |

[1] according to DIN 53 194
[2] according to DIN 55 921
[3] according to DIN 53 200
[4] according to DIN 53580
[5] relative to the substance dried for 2 hours at 105° C.
[6] relative to the substance annealed for 2 hours at 1000° C.
[8] HCl content is a component of the annealing loss In order to produce AEROSIL, a volatile silicon compound is sprayed into an oxyhydrogen flame of hydrogen and air. Silicon tetrachloride is used in most instances. This substance hydrolyzes under the influence of the water produced in the oxyhydrogen gas reaction to silicon dioxide and hydrochloric acid. After leaving the flame, the silicon dioxide enters into a so-called coagulation zone in which the AEROSIL primary particles and primary aggregates agglomerate. The product present in this stage as a type of aerosol is separated in cyclones from the gaseous accompanying substances and subsequently post-treated with hot moist air. The residual hydrochloric-acid content can be lowered below 0.025 % by this method. Since the AEROSIL accumulates at the end of this process with a bulk density of only approximately 15 g/l, a vacuum compression follows, and this can achieve stamping densities of approximately 50 g/l and more.

The particle sizes of the products obtained in this manner can be varied by adjusting the reaction conditions. Such parameters are e.g. the flame temperature, the amount of hydrogen or oxygen, the amount of silicon tetrachloride, the dwell time in the flame or the length of the coagulation distance.

The BET surface is determined according to DIN 66 131 with nitrogen.

The pore volume is calculated from the sum of the micro, meso and macropores.

The breaking strength is determined by means of the breaking-strength tester of the firm Erweka, type TBH 28.

The determination of the micro and mesopores is made by recording an N$_2$ isotherm and evaluating it according to BET, de Boer and Barret, Joyner, Halenda.

The determination of the macropores is made by the Hg injection method.

The abrasion is determined by means of the abrasion and triability tester of the firm Erweka, type TAR.

EXAMPLE 1

62.0 % Aerosil 200
5.8 % aluminum stearate
9.5 % methyl cellulose
3.7 % graphite
19.0 % urea are compacted with the addition of water, dried for 24 hours at 100° C., comminuted to a flowable powder and deformed with a concentric-running tablet press to pressed parts.

The resulting raw tablets are calcined at 200° C. and subsequently tempered for 4 hours at 1000° C.

The pressed parts obtained exhibit the following physico-chemical characteristic data:

| | |
|---|---|
| Outer diameter | 5 mm |
| BET surface | 148 m$^2$/g |
| Pore volume | 0.73 ml/g |
| Pore distribution | no pores <5 nm, only meso and macropores |
| Breaking strength | 12.2 N |
| Abrasion | 0.45% |
| Bulk weight | 530 g/l |
| Composition | 99.2% SiO$_2$ |

EXAMPLE 2

62.5 % Aerosil 200
5.8 % magnesium stearate
9.6 % methyl cellulose
22.1 % urea are deformed by the method of Example 1 to pressed parts. The raw tablets are calcined at 250° C. and subsequently tempered for 6 hours at 750° C.

The resulting pressed parts exhibit the following physico-chemical characteristic data:

| | |
|---|---|
| Outer diameter | 6 mm |
| BET surface | 176 m$^2$/g |
| Pore volume | 0.76 ml/g |
| Pore distribution | no pores <4 nm, only meso and macropores |
| Breaking strength | 54 N |
| Abrasion | 0.9% |
| Bulk weight | 500 g/l |
| Composition | 99.4% SiO$_2$ |

EXAMPLE 3

62.5 % Aerosil 380
5.8 % magnesium stearate
9.6 % methyl cellulose
22.1 % urea are compacted with the addition of water, dried for 24 hours at 100° C., comminuted to a flowable powder and deformed on an eccentric press to pressed parts.

The raw tablets are calcined at 250° C. and subsequently tempered for 8 hours at 700° C.

The pressed parts obtained exhibit the following physico-chemical characteristic data:

| | |
|---|---|
| Outer diameter | 5 mm |
| BET surface | 289 m$^2$/g |
| Pore volume | 1.09 ml/g |
| Pore distribution | no pores <5 nm, only meso and macropores |
| Breaking strength | 105 N |
| Abrasion | 0.9% |
| Bulk weight | 480 g/l |
| Composition | 99.4% SiO$_2$ |

EXAMPLE 4 are deformed by the method of Example 3 to pressed parts.

The raw tablets are calcined at 250° C. and tempered for 8 hours at 900° C.

The pressed parts obtained exhibit the following physicochemical characteristic data:

| | |
|---|---|
| Outer diameter | 5 mm |
| BET surface | 73 m$^2$/g |
| Pore volume | 0.88 ml/g |
| Pore distribution | no pores <5 nm, only meso and macropores |
| Breaking strength | 55 N |
| Abrasion | 0.9% |
| Bulk weight | 450 g/l |
| Composition | 99.4% SiO$_2$ |

We claim:

1. Shaped articles comprising phyrogenically produced silicon dioxide, said shaped articles having the following physicochemical characteristic data:

| | |
|---|---|
| Outer diameter | 2 to 15 mm |
| BET surface | 50 to 400 m$^2$/g |
| Pore volume | 0.6 to 1.3 ml/g |
| Breaking strength | 50–150 N |
| Pore distribution | no pores <5 [nm] diameter, only meso and macropores |
| Composition | >99% by weight SiO$_2$ |
| Abrasion | <1.0% |
| Bulk weight | 400–500 g/l |

2. A catalyst comprising the shaped articles of claim 1 as a carrier and a catalytically active substance thereon.

3. A method for producing pressed parts based on pyrogenically produced silicon dioxide said pressed parts having the following physico-chemical characteristics:

| | |
|---|---|
| Outer diameter | 2 to 15 mm |
| BET surface | 50 to 400 m$^2$/g |
| Pore volume | 0.6 to 1.3 ml/g |
| Breaking strength | 50–150 N |
| Pore distribution | no pores <5 nm diameter only meso and macropores |
| Composition | >99% by weight SiO$_2$ |
| Abrasion | <1.0% |
| Bulk weight | 400–500 g/l | said method comprising homogenizing pyrogenically produced silicon dioxide with (1) at least one member of the group consisting of urea, methyl cellulose and magnesium stearate, (2) graphite and (3) aluminum stearate with the addition of water, drying the homogenizate at a temperature of 80° to 120° C, comminuting the dried homogenizate to a powder, pressing the powder to pressed parts and tempering the pressed parts for a period of 0.5 to 8 hours at a temperature of 400° to 1200° C.

* * * * *